June 26, 1962  A. L. LAMBERT  3,040,805
INFRA-RED GAS-FUELED HEATER
Filed April 7, 1960
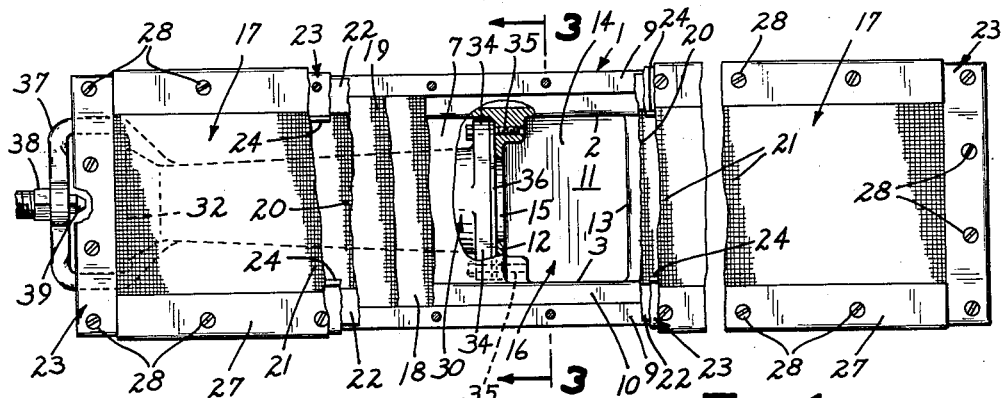
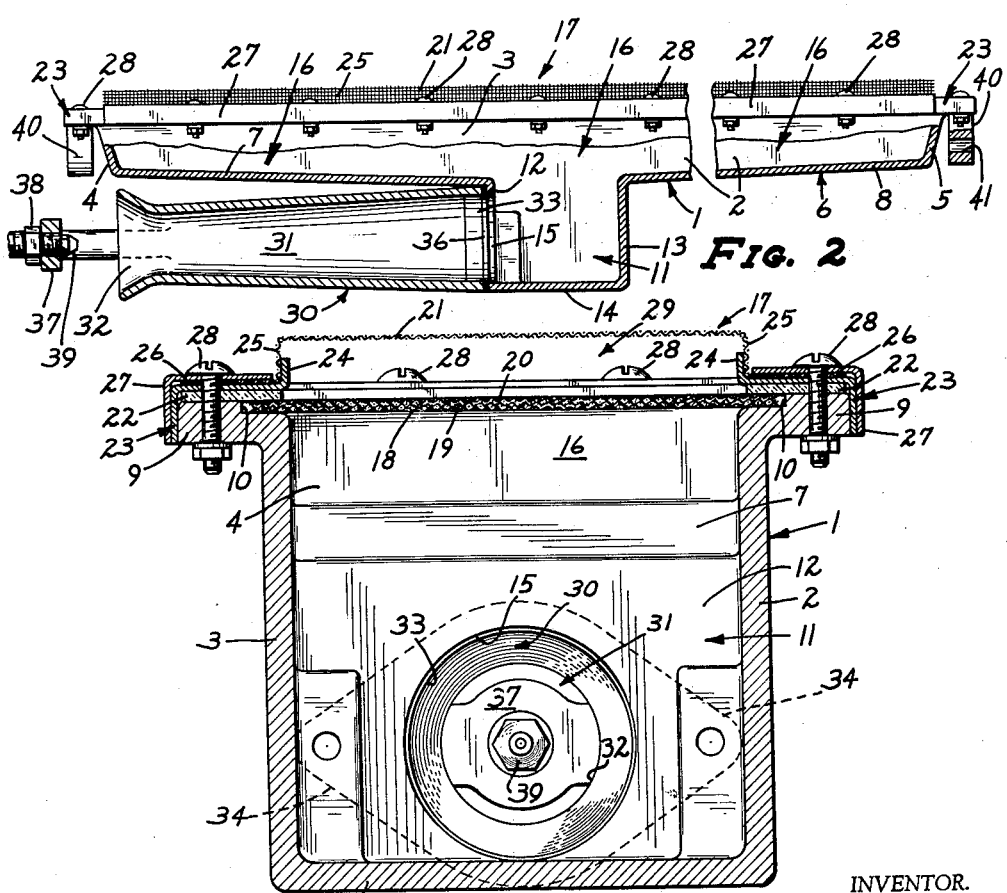
INVENTOR.
AGARD L. LAMBERT
BY
Merchant & Merchant
ATTORNEYS

United States Patent Office 3,040,805
Patented June 26, 1962

3,040,805
INFRA-RED GAS-FUELED HEATER
Agard L. Lambert, P.O. Box 88, Virginia, Minn.
Filed Apr. 7, 1960, Ser. No. 20,660
1 Claim. (Cl. 158—114)

My invention relates generally to infra red heat generators, and more specifically to such heat generators which burn gaseous fuel mixed with the proper amount of air to support combustion.

An important object of my invention is the provision of novel burner base and mantle construction which provides for highly efficient mixing of gaseous fuel with sufficient air to support combustion, so that even and thorough combustion of the gas occurs uniformly over the entire surface of the mantle. To this end I provide a generally rectangular base member defining a mixing chamber and having a mixing tube extending longitudinally thereof from adjacent one end wall of the base member and terminating in spaced relation to the opposite end wall; the base further defining a recess intermediate its ends, the recess opening into said chamber, the delivery end of the mixing tube communicating with the recess and directing gas and air against one wall of the recess, whereby to create turbulence in the stream of gas and air entering the chamber, and thorough mixing of the gas with the air, together with uniform distribution of the air-gas mixture over the area of the burner mantle.

Another object of my invention is the provision of a heat generator having a base and a burner mantle, a mixing tube for mixing of the gas and air, and delivery thereof to the burner mantle, and means for insulating the mixing tube from the base, whereby the mixing tube is maintained at a substantially lower temperature than that of the base.

Another object of my invention is the provision of a heat generator which is extremely quiet in operation, and of a mantle arrangement which prevents blow-back of ignited gases rearwardly into the base portion of the burner.

Another object of my invention is the provision of mantle construction comprising a plurality of metallic mesh screens in face to face superposed relation, and a radiant element comprising an added metallic mesh screen in outwardly spaced generally parallel relation to said superposed screens, to provide a combustion chamber between said radiant element and said superposed screens.

The above, and still further highly important objects and advantages of my invention will become apparent from the following detailed specification, appended claim and attached drawings.

Referring to the drawings, which illustrate the invention, and in which like reference characters indicate like parts throughout the several views:

FIG. 1 is a view in front elevation of an infra red heat generator produced in accordance with my invention, some parts being broken away and some parts being shown in section;

FIG. 2 is a view in bottom plan with respect to FIG. 1, some parts being broken away and some parts shown in section; and, FIG. 3 is an enlarged transverse section taken on the line 3—3 of FIG. 1, and angularly displaced with respect to FIG. 1.

In the preferred embodiment of my invention illustrated, an elongated base is indicated in its entirety by the numeral 1, the base comprising opposed parallel top and bottom or side walls 2 and 3, end walls 4 and 5, a rear wall 6 comprising longitudinally spaced rear wall portions 7 and 8, and an open front. Preferably, the base 1 is integrally formed of cast metal such as iron or an alloy thereof, the open front of the base being formed to provide an outwardly projecting marginal flange 9 having a laterally inwardly and forwardly opening marginal recess 10 the purpose of which will hereinafter be described.

As shown in FIG. 2, the rear wall portions 7 and 8 slope longitudinally inwardly and rearwardly from their respective end walls 4 and 5, and cooperate with the side walls 2 and 3 to provide a forwardly opening recess 11 at the inner ends of the rear wall portions 7 and 8, the recess 11 being disposed centrally between the opposite ends of the base 1. The recess 11 is defined by opposite end walls 12 and 13, portions of the side walls 2 and 3, and a rear wall 14, the end wall 12 being provided with an opening 15 for the admission of gas and air to the mixing chamber defined by the walls 2–8 of the base 1, said mixing chamber being indicated by the numeral 16.

The open front of the base 1 is covered by a mantle 17 comprising a plurality of superposed mesh screens 18, 19 and 20 in face to face engagement, and a radiant element in the nature of a mesh screen 21. The screens 18–21 are preferably made from a nickel alloy, such as Inconel, and are generally rectangular in outline, the marginal edge portions of the burner screens 18–20 being received in the recess 10 of the marginal flange 9. Preferably, the inner and outer burner screens 18 and 20 respectively are of forty mesh Inconel wire, the intermediate burner screen 19 and the radiant element 21 being preferably of No. ten mesh wire.

A gasket 22, of asbestos or like material, overlies the marginal edge portions of the burner screens 18–20 and the marginal flange 9, and a generally rectangular clamping frame 23 overlies the gasket 22 and flange 9. At its opposite sides, the frame 23 is provided with forwardly projecting longitudinal flanges 24 which engage inturned side portions 25 of the radiant element 21 to partially support the same, the radiant element 21 further being formed at its opposite longitudinal edge portions with laterally outwardly projecting longitudinal flanges 26 which overlie adjacent portions of the clamping frame 23. A pair of angle bars 27 are superposed on the flanges 26 of the radiant element 21 and opposite sides of the clamping frame 23, and nut-equipped clamping screws 28 extend through suitable apertures in the angle bars 27, flanges 26, gasket 22 and marginal flange 9, to releasably lock the burner screens 18–20 and the radiant element 21 in place. It will be noted that the radiant element 21 is devoid of inturned portions, such as the inturned sides 25, at the opposite ends thereof, the radiant element 21 cooperating with the burner screens 18–20 to define an open ended combustion chamber 29. It will be further noted that the opposite ends of the clamping frame 23 are releasably secured to the marginal flange 9 by other nut-equipped clamping screws 28.

A mixing tube 30, defining a venturi passage 31, extends longitudinally of the base 1 and is disposed rearwardly of the rear wall portion 7 thereof, the inlet end 32 of the mixing tube 30 being disposed adjacent the end wall 4 of the base 1. The delivery end 33 of the mixing tube 30 is provided with opposed mounting flanges 34 having suitable openings therein for the reception of mounting screws or the like 35 that are screw threaded into threaded openings in the end wall 12 of the recess 11. Preferably, and as shown, a heat insulating gasket 36, of asbestos or the like, is interposed between the delivery end 33 of the mixing tube 30, and the adjacent end wall 12 of the recess 11. At its inlet end 32, the mixing tube 30 is provided with a yoke-like portion 37 which supports the delivery end of a gaseous fuel conduit or the like 38, in a manner to direct the fuel from the conduit 38 axially into the venturi passage 31. Preferably, the conduit 38 terminates in an injection nozzle or the like 39 of well-known construction.

It will be noted that the axis of the venturi passage 31 is substantially parallel to the plane of the burner screens 18–20 and normal to the recess end wall 13. Hence, when gaseous fuel is injected into the venturi passage 31 through the conduit 38 and nozzle 39 from a suitable source of supply, not shown, the gas, together with air drawn into the mixing tube 30 by venturi action through the inlet end 32, impinges on the recess end wall 13. During movement of the gas and air through the venturi passage 31, some mixing of the gas and air occurs. However, when the mixture enters the recess 11, impingement thereof on the end wall 13 creates turbulence in the stream to cause the gas and air to be thoroughly mixed as it enters the mixing chamber 16. When the gas is ignited, combustion thereof takes place in the combustion chamber 29, and some heat radiates to the rear wall 6 of the casing 1 and the walls of the recess 11. The spacing between the rear wall portion 7 and the mixing tube 30, together with the asbestos gasket 36, tends to maintain the mixing tube 30 at a substantially lower temperature than that of the base 1. Hence, when the air-gas mixture enters the recess 11, a rapid expansion of the air-gas mixture takes place. This action, combined with the turbulence of the air-gas mixture as it enters the mixing chamber 16, causes the gas and air to be completely mixed and to be uniformly delivered to the entire surface of the inner burner screen 18 at a uniform pressure over the entire surface. Thus, as the mixture passes through the burner screens 18–20 and burns within the combustion chamber 29, the entire front portion of the radiant element 21 becomes uniformly heated. The longitudinally inward and rearward slope of the rear wall portions 7 and 8 aid materially in obtaining uniform pressure within the mixing chamber 16 against the entire length of the burner.

One of the important advantages of the instant generator lies in the elimination of extensive baffle means in the base for achieving a complete mixing of the gaseous fuel and combustion-supporting air, before the same arrives at the mantle. With the instant design of the base 1, I am enabled to produce a highly efficient burner at a minimum cost, and in which, by elimination of baffle elements, back pressure is reduced to a minimum. The above mentioned heating of the air-gas mixture as it flows into the recess, and the rapid expansion of the mixture caused by the heating thereof, results in a highly increased velocity of movement thereof toward and through the burner screens 18–21. This increased velocity of flow of the combustible mixture, combined with the above mentioned reduction of back pressure, is very effective in decreasing the possibility of back fire or combustion of the mixture within the chamber 16 or recess 11.

The marginal flange 9, at the opposite ends of the base 1, is provided with a plurality of rearwardly projecting lugs 40, having apertures 41 therethrough, one of which is shown, whereby my infra-red heat generator may be mounted to a suitable supporting structure, not shown. It will be appreciated that the device may be mounted in any desired position, with the mantle disposed in vertical or horizontal planes, or in planes at oblique angles thereto. Hence, although the base 1 is described and defined as having a rear wall and an open front, it will be understood that, in some installations, the rear end may be the top wall, with the open front being the open bottom, whereby the radiant element screen 21 directs heat downwardly toward the area to be heated. The instant heat generator is capable of a wide variety of uses, the same being particularly applicable to the thawing of frozen granular material, such as ore and the like, to permit easy handling of the material during winter weather.

While I have shown and described a commercial embodiment of my infra red heater, it will be understood that the same is capable of modification, and that modification may be made without departure of the spirit and scope of the invention, as defined in the claim.

What I claim is:

In an infra-red heater, an elongated base having opposed side walls, end walls, a pair of longitudinally spaced wall portions defining a rear wall, and a generally rectangular open front, a mantle covering the open front of said base, said burner and base cooperating to define a mixing chamber, said side walls and rear wall portions cooperating to define a rearwardly extending forwardly opening recess at the inner ends of said rear wall portions and centrally between the opposite ends of said base, said recess having opposed generally parallel end walls extending transversely of said base, the width of said recess being substantially equal to the width of said mixing chamber, one of said end walls of the recess having a fuel inlet opening therethrough, and a mixing tube secured to said one of the end walls of said recess and extending longitudinally of said base in rearwardly spaced relation to one of said rear wall portions, said tube defining a venturi passage aligned with said fuel inlet opening for reception of fluid fuel and combustion air and delivery thereof to said chamber, the delivery end of said venturi passage adjacent said recess having a diameter substantially less than the width of said recess, said mixing tube directing said fuel and air toward the end wall of said recess opposite said inlet opening rearwardly of said rear wall portions, whereby to create turbulence in the stream of air and fuel entering said chamber and thorough mixing of said fuel and air.

References Cited in the file of this patent

UNITED STATES PATENTS

| 445,223 | Knight | Jan. 27, 1891 |
| 1,313,196 | Lucke | Aug. 12, 1919 |
| 1,519,056 | Risenger | Dec. 9, 1924 |
| 1,727,714 | Kahn | Sept. 10, 1929 |
| 2,168,758 | Bellamy | Aug. 8, 1939 |

FOREIGN PATENTS

| 477,117 | France | June 29, 1915 |
| 494,087 | Great Britain | Oct. 17, 1938 |
| 826,673 | Great Britain | Jan. 20, 1960 |